United States Patent [19]

McMichael, Jr.

[11] Patent Number: 4,487,259
[45] Date of Patent: Dec. 11, 1984

[54] PREPACKED WELL SCREEN AND CASING ASSEMBLY

[75] Inventor: Charles W. McMichael, Jr., Duson, La.

[73] Assignee: UOP Inc., Des Plaines, Ill.

[21] Appl. No.: 476,180

[22] Filed: Mar. 17, 1983

[51] Int. Cl.$^3$ .............................................. E21B 43/08
[52] U.S. Cl. ..................................... 166/228; 166/236
[58] Field of Search ................ 166/228, 233, 234, 236

[56] References Cited

U.S. PATENT DOCUMENTS

| Re. 14,756 | 11/1919 | Scott | 166/228 |
| 1,342,813 | 6/1920 | Huston | 166/228 |
| 1,473,644 | 11/1923 | Rodrigo, Sr. | 166/236 |
| 1,899,065 | 2/1933 | Tilbury | 166/228 |
| 3,357,564 | 12/1967 | Medford, Jr. et al. | 166/236 |
| 3,683,056 | 8/1972 | Brandt et al. | 166/228 X |

Primary Examiner—Stephen J. Novosad
Assistant Examiner—Thuy M. Bui
Attorney, Agent, or Firm—James R. Hoatson, Jr.; Barry L. Clark; William H. Page, II

[57] ABSTRACT

Prepacked well screen and casing assembly for use in wells provides very substantial savings in the expense and time required to complete a well as compared to the conventional techniques of down-hole perforating and gravel packing. The assembly includes an external casing or liner member which would be provided with a large number of perforations during manufacture. A pipe base screen jacket assembly is positioned concentrically within the casing and attached to it by readily machinable upper and lower annular ring members. The hollow cylindrical annulus between the screen and casing is filled with a resin-coated gravel pack material which is cured after the fill operation to maintain its integrity. The assembly can be hung in the uncased producing zone of a new well by a liner hanger or could be placed in an existing cased well which is to be reworked by first milling away the existing casing in the production zone. If reworking of the well should ever be required, a washover tool can be used to remove the annular ring members so that the screen jacket assembly could be replaced or repacked by conventional techniques.

4 Claims, 1 Drawing Figure

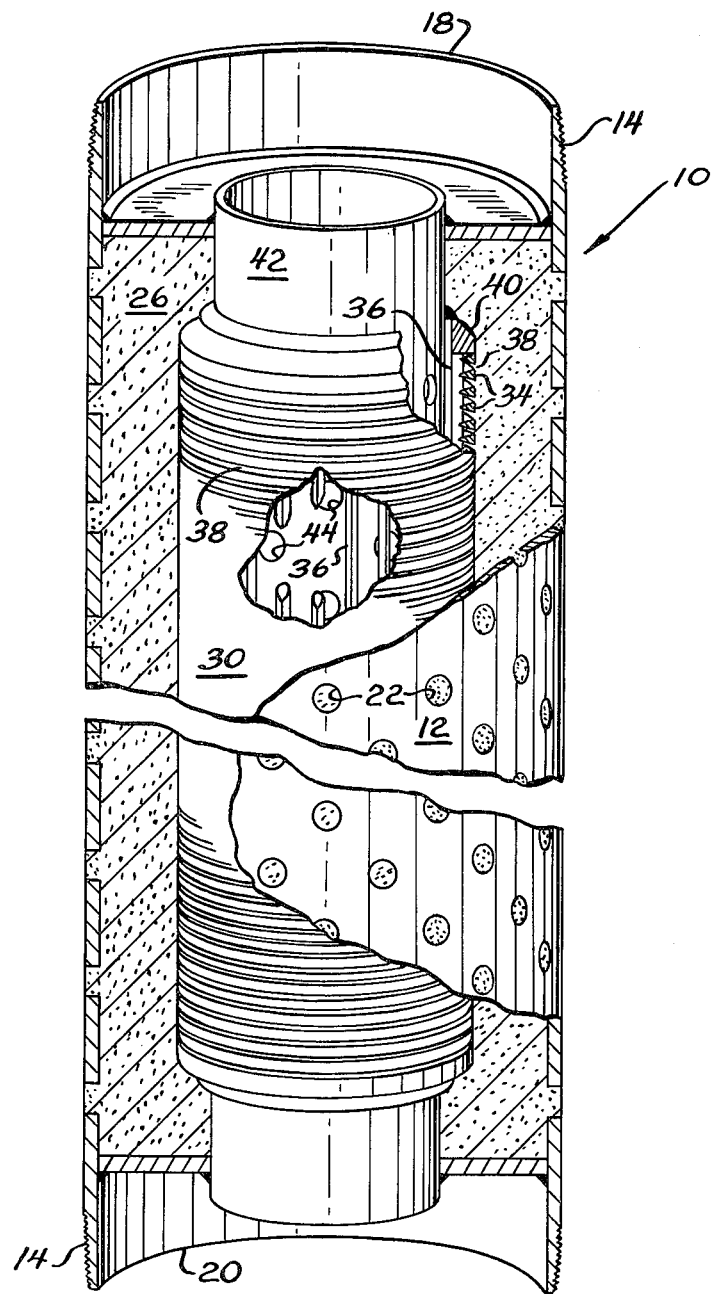

PREPACKED WELL SCREEN AND CASING ASSEMBLY

BACKGROUND OF THE INVENTION

The invention relates to wells of all types which require sand control but particularly to deep wells such as those used for producing oil and/or gas. In deep wells it is extremely costly to complete the well in the producing zone by the conventional techniques of running casing, cementing, down-hole perforating, running the screen jacket assembly and then gravel packing with a cross-over tool. The perforating operation is particularly expensive and can be dangerous since explosives are typically used to form the perforations. Furthermore, it is the usual practice to form a total of only about twelve $\frac{3}{4}''$ perforations per foot of casing length. The relatively few number of holes and their large size sometimes tends to produce voids or "holidays" in the later installed sand-controlling gravel pack since a much greater flow velocity exists than would be the case if many more perforations were present. The problem of voids in the gravel pack and consequent failure when the fine formation material moves right into the screen and erodes it is especially great when the hole is highly deviated.

Prepack screen assemblies have been manufactured in the past which include a uniform consolidated or unconsolidated annulus of resin-coated sand or gravel which fills the space between a pair of concentric screen members. They are typically used with an external gravel pack since formation sand would plug their slots. If used in a deep hole, such assemblies could not be easily removed in the event of a failure of the internal annular gravel pack since the prepack screens are typically made of stainless steel which would be difficult to cut through with a wash-over tool. Furthermore, they would probably tear apart and jam as the wire and rod of which they are made comes apart.

The resin-coated gravel or sand used in the aforementioned prepack screen assemblies is preferably of the type described in an article entitled, "Performance Review of Phenolic-Resin Gravel Packing" by Lowell W. Saunders and Howard L. McKinzie which appeared in the February 1981 issue of "JOURNAL OF PETROLEUM TECHNOLOGY" at pages 221-228. Although such gravel has been supplied as part of a precured packing between two concentric well screens, it is usually used as a direct replacement for ordinary gravel packs which are formed in situ. The gravel is supplied in loose form from bags and is cured after installation by the relatively high temperatures in the well. The cured resin-coated gravel is inert to acid but is soluble in basic fluids having a high pH. The latter property makes it simple to easily remove the packing at any time. Another article describing the uses of uncured resin-coated sand and various environments in which it can be used is Paper No. SPE 7004 of A. Richard Sinclair and John W. Graham entitled, "An Effective Method of Sand Control." The paper was presented at a meeting of the Society of Petroleum Engineers of AIME in Lafayette, La. on Feb. 15-16, 1978.

SUMMARY OF THE INVENTION

It is among the objects of the present invention to provide a novel well screen assembly which permits a well to be completed without the use of a down-hole gravel packing operation. Another object is to provide a well screen assembly which provides a large overall flow through an entire gravel pack but a much lower flow rate through any one part of the gravel pack than the conventional technique. Still another object is to provide a technique for producing a gravel pack for a well screen which will overcome the void and channeling problems of gravel packs produced down-hole. Yet another object is to provide a prepacked assembly of a well screen and perforated casing or liner member which will overcome the deficiencies of prior art prepacked well screens.

The foregoing and other objects and advantages are achieved by the prepacked well screen and casing assembly of the present invention. The assembly includes an outer casing or liner portion which would typically be sized so that, when the assembly is to be used, it can be mounted "down-hole" by a conventional liner hanger. The liner hanger would engage and be retained near the bottom of the inner wall of the lowermost previously installed casing section. The said last mentioned section would of course have a larger diameter than the casing portion being hung from its internal wall. The outer casing portion is perforated outside of the well before assembly and preferably by the same type of conventional perforating apparatus used to drill patterns of holes in the pipe base portion of a pipe base well screen. A typical pattern would be to have $\frac{1}{2}''$ I.D. holes arranged circumferentially on $1''$ centers with the holes in alternate rows being offset. Thus, a casing member having a $9\frac{5}{8}''$ O.D. can have $264\frac{1}{2}''$ holes per foot as compared to only about $12\frac{3}{4}''$ holes per foot which are typically provided when a casing must be perforated "down-hole." As previously discussed, this greatly increases the uniformity of flow through the assembly and minimizes plugging and channeling.

A pipe base support for the well screen jacket portion of the assembly is left unperforated near its ends and is perforated in its central region wherein the screen jacket is located. The screen jacket would normally be welded to the pipe base support at both ends. However, where the screen assembly is to be used in a high temperature environment wherein the different temperature coefficients of expansion of a stainless steel screen jacket and a carbon steel pipe base could cause buckling, the screen jacket could be welded at just one end. The other end of the screen jacket could be shrunk-fit to the pipe base as disclosed in James A. Lilly application Ser. No. 258,360, filed Apr. 28, 1981 now U.S. Pat. No. 4,378,840. The shrunk-fit end would expand and be capable of sliding on the pipe base to relieve stresses at high temperatures. Although the pipe base support for the screen jacket has been disclosed as a cylindrical pipe, it could also be formed of welded channels as disclosed in Geske U.S. Pat. No. 4,096,911.

After the casing portion has been perforated and the screen jacket has been attached to its generally cylindrical support base, a first annular ring of easily drillable steel is welded to one unperforated end portion of the support base. The well screen with the said ring attached is then located inside the unperforated end portion of the casing member and the ring is welded to the inner wall of the casing so as to centralize the screen within the casing. The casing-well screen assembly is then positioned vertically and its outer perforated surface is covered by a covering of a fabric, a metal fine mesh cloth, or a sleeve, for example. The covering can be any suitable material which will block off the outer ends of the perforations while loose resin-coated sand or gravel or other porous material is loaded into and consolidated in the perforations and in the annular space defined by the casing, well screen and first annular ring. A second annular ring of easily drillable steel can then be placed on top of the porous material and welded to the upper unperforated portions of the casing and well screen support base. The entire assembly including the covering is then cured such as by the use of dry heat in an oven or by steam or hot water, for example, until the resin-coated particles are fused together in a unitary consolidated mass. At this stage, the casing covering can be removed since the particles would no longer be able to fall out of the perforations. The amount of resin coating on the sand particles should be just sufficient to bond adjacent particles without significantly reducing the porosity of the consolidated mass. The size of the particles would be selected in relation to the width of the slots in the screen jacket and the size of the particles in the formation in accordance with the usual practice in the industry.

By using easily machinable material for the annular rings, it would be possible, any time after the casing and screen assembly was installed, to remove and replace the screen assembly independently of the casing in a wash-over operation without affecting the liner. A new ordinary screen could then be installed and gravel packed in the usual fashion. Furthermore, if the consolidated packing should somehow become defective while the screen remained intact, the packing could be removed by injecting a high pH fluid which would dissolve the resin bonds between the particles. A new gravel pack could then be installed in the conventional fashion. It is anticipated that there will be little if any need to perform the aforementioned operations since the bonded and consolidated packing should obviate channeling and the slot erosion which results. Also, the large number of casing perforations will resist plugging and will cause a relatively uniform flow distribution through the entire annular packed area. This is a considerable advantage over prior art prepacked screens in which the very small width screen slots can be susceptible to plugging by the formation materials. Furthermore, the jacket strength of prepacked screens would normally be insufficient to replace normal casing. In addition, prepacked screens require specialized installation equipment which is costly and time-consuming compared to the screen casing assembly of the present invention with its rugged exterior. Also, the potential for damage to the rather fragile screen slots of a prepacked screen during shipping or installation is significant.

DETAILED DESCRIPTION OF THE DRAWING

The prepacked well screen and casing assembly of the invention is indicated generally in the drawing at 10 and comprises a length of well casing 12 which might typically be of a length of 3–44'. The ends of the casing are preferably provided with threads 14 which permit the particular length of casing to be joined to other lengths in the usual fashion. Before the casing 12 is assembled into the assembly 10, it is perforated in the intermediate region defined between the upper and lower annular plate members 18, 20. Since it is much easier to drill holes in the casing 12 when it is out of the ground than it is to perforate it while it is down in a hole, it is possible to provide the casing with a very large number of holes. For example, a casing having an outer diameter of $9\frac{5}{8}''$ can be provided with $264\frac{1}{2}''$ holes 22 per foot when the holes are on 1" centers whereas a typical down-hole perforated casing would have only about $12\frac{3}{4}''$ holes per foot of length. By having a larger number of holes, it is possible to have a large volume of flow but a relatively uniform, and low, rate of flow through the packed bed of gravel 26 which is positioned in the annular space defined between the casing 12, the annular plates 18, 20 and the slotted screen jacket 30. The screen jacket 30 is preferably formed of wire 34 which is helically wound and welded to screen support rods 36 so as to form a continuous slot 38 of constant width, typically 0.006–0.012". The screen jacket 30 has end portions such as rings 40 which may be welded to a pipe-base support member 42. The pipe member 42 is perforated at 44 inside the screen jacket 30 but is unperforated at its ends.

The manufacturing technique has been previously discussed as have the techniques for mounting the prepacked well screen and casing assembly in a well. Obviously, since the ends of the casing portions 12 are threaded, a plurality of assembly sections 10 could be joined together with conventional couplings (not shown). There would be no need to have the cylindrical support bases 42 of connected assemblies joined since the bases are affixed and sealed relative to the casing 12 by the welded rings 18, 20. The hole diameter and spacing pattern for the holes 22 in casing member 12 and for the holes 44 in base member 42 is preferably selected so as to maximize the flow area while maintaining sufficient structural strength. Likewise, the hole diameter and spacing pattern for the holes 44 in base member 42 is designed to maximize flow area while maintaining sufficient structural strength in base member 42. Due to the difference in diameters of the casing and base member, the total number and area of the casing holes 22 would normally be larger than for the base member holes 44. Also, the diameter of the holes 22 would preferably be greater than that of the holes 44. For example, the holes 22 might have a diameter of 0.5" while holes 44 are 0.375". By providing many more holes in the casing 12 than can be achieved with down-hole perforating equipment, the potential for channels developing in the gravel pack 26 is substantially eliminated. Also, voids and "holidays" which are so common in down-hole-formed gravel packs can be eliminated when the resin-coated packing gravel is assembled to the casing and screen assembly in a factory or other above-ground location. In such a controlled environment, good consolidation could be achieved by vibrating the assembly or other compaction techniques, if desired. The use of an above-ground curing operation while the casing perforations are covered assures that no change will take place in the location of the gravel particles. Thus, a more consistent pack can be achieved than would appear to be possible in a down-hole cure of a down-hole-installed gravel pack utilizing uncured resin-coated gravel.

Although it has been noted that there is no need to have the cylindrical support bases 42 of connected assemblies joined since they are sealed relative to the casing, there are situations wherein it may be desirable to provide each end of the pipe base 42 with threads. For example, where several sections of screen assemblies 10 are to be placed in a well and there is some possibility that one or more of the lower sections might have to be sealed off at some date in the future, it would be advantageous to thread a conventional "seal bore sub" to the lower end of at least some of the pipes 42. The upper ends of the pipes 42 which would underlie other pipes with "seal bore subs" would be fitted with conventional "landing nipples." The "landing nipples" each have a smooth bore into which the "seal bore sub" of an adjacent assembly is lowered. Sealing rings on the exterior surface of the "seal bore subs" cause a fluid-tight connection. When it is desirable to shut off production from a lower screen, a sealing plug can be lowered by a cable through the successive pipe bases until the "landing nipple" to be sealed is reached. At this point, the sealing plug is expanded into sealing engagement with an internal groove in the "landing nipple." The aforementioned optional sealing structure does of course add to the cost of the installation but can be extremely cost effective in formations wherein a possibility exists that a lower screen might start pumping sand much sooner than an upper one or where production from a lower strata might become undesirable.

I claim as my invention:

1. A prepacked well screen and casing assembly adapted to be lowered into a well comprising an outer casing member having threaded coupling portions at the ends thereof, an extended length perforated intermediate portion, and unperforated end portions adjacent said threaded coupling portions; a slotted surface well screen jacket member supported internally of said casing member on a generally cylindrical base member, said generally cylindrical base member being of less length than said casing member and having a longitudinally extending perforated intermediate portion located within said well screen jacket member and unperforated end portions which extend from the ends of said base member which are outside said well screen jacket member to locations inside said jacket member; a pair of annular metal rings which are formed of a material softer than said screen jacket member welded to the exterior of said end portions of said base member and to the interior of said end portions of said casing member, said rings defining the ends of an annular chamber which extends axially beyond each end of said well screen jacket member; and a consolidated packing of porous, bonded together, resin-coated gravel or sand within said annular chamber and within the perforations of said perforated intermediate portion of said casing member.

2. A prepacked well screen and casing assembly according to claim 1 wherein said perforated intermediate portions of said casing member and said base member have patterns of hole perforations which are at least substantially the same in diameter and spacing.

3. A prepacked well screen and casing assembly according to claim 1 wherein said casing member contains a greater number and total area of perforations than said base member.

4. A prepacked well screen and casing assembly according to claim 1 wherein said resin-coated gravel or sand has its resin coating cured by heat so that individual particles are bonded into a consolidated mass, said coating being sufficiently thin to permit fluid flow though the mass in the space between particles.

* * * * *